US010487257B2

United States Patent
Jiang et al.

(10) Patent No.: US 10,487,257 B2
(45) Date of Patent: Nov. 26, 2019

(54) MATERIALS AND METHODS OF USE AS ADDITIVES FOR OILWELL CEMENTING

(71) Applicant: Hexion Inc., Columbus, OH (US)

(72) Inventors: Li Jiang, Katy, TX (US); Jan Beetge, Pearland, TX (US); Franklin Leal, Houston, TX (US); Elexander Salinas, Houston, TX (US)

(73) Assignee: HEXION INC., Columbus, OH (US)

( * ) Notice: Subject to any disclaimer, the term of this patent is extended or adjusted under 35 U.S.C. 154(b) by 0 days.

(21) Appl. No.: 15/654,138

(22) Filed: Jul. 19, 2017

(65) Prior Publication Data

US 2018/0022981 A1 Jan. 25, 2018

Related U.S. Application Data

(60) Provisional application No. 62/364,631, filed on Jul. 20, 2016.

(51) Int. Cl.
| | | |
|---|---|---|
| *C09K 8/487* | (2006.01) | |
| *C04B 24/26* | (2006.01) | |
| *C08L 25/10* | (2006.01) | |
| *C08L 31/04* | (2006.01) | |
| *C08L 47/00* | (2006.01) | |
| *C09K 8/467* | (2006.01) | |
| *E21B 33/14* | (2006.01) | |
| *C04B 28/04* | (2006.01) | |
| *C04B 28/02* | (2006.01) | |
| *C04B 40/00* | (2006.01) | |
| *C09K 8/035* | (2006.01) | |
| *C09K 8/473* | (2006.01) | |
| *C08L 25/14* | (2006.01) | |
| *C04B 103/40* | (2006.01) | |
| *C04B 103/46* | (2006.01) | |
| *C04B 103/50* | (2006.01) | |

(52) U.S. Cl.
CPC .......... *C09K 8/487* (2013.01); *C04B 24/2623* (2013.01); *C04B 24/2688* (2013.01); *C04B 28/02* (2013.01); *C04B 28/04* (2013.01); *C04B 40/0039* (2013.01); *C08L 25/10* (2013.01); *C08L 25/14* (2013.01); *C08L 31/04* (2013.01); *C08L 47/00* (2013.01); *C09K 8/035* (2013.01); *C09K 8/467* (2013.01); *C09K 8/473* (2013.01); *E21B 33/14* (2013.01); *C04B 2103/406* (2013.01); *C04B 2103/46* (2013.01); *C04B 2103/50* (2013.01)

(58) Field of Classification Search
CPC ........ C09K 8/487; C09K 8/035; C09K 8/467; C09K 8/473; C04B 24/2623; C04B 24/2688; C04B 24/02; C04B 24/04; C04B 40/0039; C04B 2103/46; C04B 2103/50; C04B 28/02; C04B 28/04; C04B 2103/406; C08L 25/10; C08L 31/04; C08L 47/00; C08L 25/14; E21B 33/14
USPC ........................................................ 524/524
See application file for complete search history.

(56) References Cited

U.S. PATENT DOCUMENTS

| | | |
|---|---|---|
| 3,228,907 A | 1/1966 | Eash |
| 3,375,873 A | 4/1968 | Farris |
| 3,662,830 A | 5/1972 | Martin |
| 3,821,985 A | 7/1974 | George |
| 4,047,567 A | 9/1977 | Childs et al. |
| 4,065,318 A | 12/1977 | Detroit et al. |
| 4,151,150 A | 4/1979 | Meyer et al. |
| 4,296,813 A | 10/1981 | Detroit et al. |
| 4,441,887 A | 4/1984 | Funk |
| 4,537,918 A | 8/1985 | Parcevaux et al. |
| 4,569,395 A * | 2/1986 | Carpenter ............... C04B 28/02 106/803 |
| 4,601,758 A | 7/1986 | Nelson |
| 4,700,780 A | 10/1987 | Brothers |
| 4,806,164 A | 2/1989 | Brothers |
| 4,926,944 A | 5/1990 | Schilling |
| 5,012,870 A | 5/1991 | Schilling |
| 5,093,449 A | 3/1992 | Durney et al. |
| 5,101,902 A | 4/1992 | Parcevaux et al. |
| 5,124,312 A | 6/1992 | Wang |
| 5,149,370 A | 9/1992 | Olaussen et al. |
| 5,252,128 A | 10/1993 | Gopalkrishnan |
| 5,258,072 A | 11/1993 | Gopalkrishnan et al. |
| 5,258,428 A | 11/1993 | Gopalkrishnan |
| 5,262,452 A | 11/1993 | Gopalkrishnan |
| 5,300,542 A | 4/1994 | Gopalkrishnan |
| 5,370,181 A | 12/1994 | Nahm et al. |
| 5,401,786 A | 3/1995 | Gopalkrishnan |
| 5,472,051 A | 12/1995 | Brothers |
| 5,679,731 A | 10/1997 | Rodriguez |
| 5,728,210 A | 3/1998 | Moran et al. |
| 5,753,037 A | 5/1998 | Franz et al. |
| 5,850,880 A | 12/1998 | Moran et al. |

(Continued)

FOREIGN PATENT DOCUMENTS

| | | | |
|---|---|---|---|
| GB | 1484057 | * | 8/1977 |
| KR | 101489653 B1 | * | 2/2015 |
| WO | WO2014196618 | | 12/2014 |

OTHER PUBLICATIONS

KR 101489653 B1, machine translation, Espacenet. (Year: 2015).*

*Primary Examiner* — Josephine L Chang

(57) ABSTRACT

The embodiments described herein generally relate to methods and chemical compositions for use with cementing processes. In one embodiment, a composition is provided comprising a random tetracopolymer having the formula styrene-butadiene-acrylic-fumaric acid, a polyvinyl acetate, and a nonionic surfactant.

14 Claims, No Drawings

(56) References Cited

U.S. PATENT DOCUMENTS

| | | |
|---|---|---|
| 5,874,387 A | 2/1999 | Carpenter et al. |
| 5,883,054 A | 3/1999 | Hernandez et al. |
| 5,975,220 A | 11/1999 | Mueller et al. |
| 5,988,279 A | 11/1999 | Udarbe et al. |
| 6,085,840 A | 7/2000 | Laramay et al. |
| 6,089,318 A | 7/2000 | Laramay et al. |
| 6,136,935 A | 10/2000 | Udarbe et al. |
| 6,270,565 B1 | 8/2001 | Heathman |
| 6,391,952 B1 | 5/2002 | Bett et al. |
| 6,562,122 B2 | 5/2003 | Vijn et al. |
| 6,730,637 B1 | 5/2004 | Stewart et al. |
| 6,776,237 B2 | 8/2004 | Dao et al. |
| 6,902,001 B2 | 6/2005 | Dargaud et al. |
| 6,953,050 B2 | 10/2005 | Cavagna |
| 6,964,302 B2 | 11/2005 | Luke et al. |
| 7,073,585 B2 | 7/2006 | Morgan et al. |
| 7,226,895 B2 | 6/2007 | Xiang |
| 7,285,166 B2 | 10/2007 | Luke et al. |
| 7,368,490 B2 | 5/2008 | Patel et al. |
| 7,384,892 B2 | 6/2008 | Melbouci et al. |
| 7,384,893 B2 | 6/2008 | Morgan et al. |
| 7,384,894 B2 | 6/2008 | Morgan et al. |
| 7,449,430 B2 | 11/2008 | Guichard et al. |
| 7,530,396 B1 | 5/2009 | Reddy et al. |
| 7,784,542 B2 | 8/2010 | Roddy et al. |
| 7,971,644 B2 | 7/2011 | Ladva et al. |
| 8,020,618 B2 | 9/2011 | Barlet-Gouedard et al. |
| 8,053,394 B2 | 11/2011 | Xiang et al. |
| 8,157,009 B2 | 4/2012 | Patil et al. |
| 8,393,391 B2 | 3/2013 | Willimann et al. |
| 8,529,694 B2 | 9/2013 | Herschke et al. |
| 8,598,093 B2 | 12/2013 | Roddy et al. |
| 8,623,791 B2 | 1/2014 | Yang et al. |
| 8,710,131 B2 * | 4/2014 | Bergman .................. C08F 2/20 524/105 |
| 8,741,817 B2 | 6/2014 | Tarafdar et al. |
| 8,962,710 B2 | 2/2015 | Michaux et al. |
| 9,006,152 B2 | 4/2015 | Patil et al. |
| 9,181,130 B2 | 11/2015 | Dombrowski et al. |
| 2009/0029878 A1 | 1/2009 | Bicerano |
| 2009/0032252 A1 | 2/2009 | Boney et al. |
| 2011/0056752 A1 | 3/2011 | Young et al. |
| 2011/0094746 A1 | 4/2011 | Allison et al. |
| 2012/0138299 A1 | 6/2012 | Joseph et al. |
| 2012/0231980 A1 | 9/2012 | Zhang et al. |
| 2014/0051606 A1 | 2/2014 | Dobson et al. |
| 2014/0238676 A1 * | 8/2014 | Carelli .................... C04B 28/02 166/292 |
| 2014/0367104 A1 | 12/2014 | Michaux et al. |
| 2015/0191644 A1 | 7/2015 | Patil et al. |
| 2015/0252243 A1 | 9/2015 | Ojong-Besong et al. |
| 2015/0275065 A1 | 10/2015 | Murphy et al. |
| 2016/0137903 A1 | 5/2016 | Friedheim et al. |
| 2018/0230357 A1 | 8/2018 | Haydon et al. |

* cited by examiner

MATERIALS AND METHODS OF USE AS ADDITIVES FOR OILWELL CEMENTING

RELATED APPLICATION DATA

This application claims benefit to U.S. Provisional Application No. 62/364,631, filed Jul. 20, 2016, of which the entire contents of the application are incorporated by reference herein.

FIELD OF THE INVENTION

The present invention relates to compositions and products for cementing processes, in particular, as additives to cementing compositions used in wellbore treatment processes.

BACKGROUND

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Cement compositions are commonly utilized in subterranean operations, particularly subterranean well completion and remedial operations. For example, cement compositions are deployed in primary cementing operations whereby pipe strings such as casings and liners are cemented in well bores. In performing primary cementing, cement compositions are pumped into the annular space between the walls of a well bore and the exterior surface of the pipe string disposed therein. The cement composition is permitted to set in the annular space, thereby forming an annular sheath of hardened, and hence substantially impermeable, cement therein that supports the pipe string in the center of the well bore and at the same time bonds the exterior surfaces of the pipe string to the walls of the well bore. Hydraulic cement compositions also are used in such remedial cementing operations as plugging highly permeable zones or fractures in well bores, plugging cracks and holes in pipe strings, and the like.

Often the hydraulic cement must be placed within or next to a porous medium, for example earth strata surrounding the wellbore. In such a circumstance, water tends to filter out of the slurry and into the strata during placement prior to setting of the cement. A number of difficulties arise from an uncontrolled fluid loss of this type. Such difficulties include an uncontrolled setting rate, improper placement of the slurry, impaired strength properties, and contamination of the surrounding strata. Excessive fluid loss, inter alia, causes a cement composition to be prematurely dehydrated, which may limit the amount of cement composition that can be pumped and subsequently the time allowable for the pumping operation. This may also decrease the compressive strength of the cement composition and negatively impact bond strength between the desired cement composition and a subterranean zone, the walls of pipe string and/or the walls of the well bore. These conditions are all undesirable in oil and gas well cementing operations.

In order for such well cementing operations to be successful, the cement compositions utilized may include a fluid loss control component to reduce the loss of fluid, e.g., water, from the cement compositions when they contact permeable subterranean formations and zones. The effectiveness of a fluid loss additive is often related to the size or the molecular weight of the polymer. A "large" polymer, or a polymer with a higher molecular weight, generally is more effective in preventing excessive fluid loss from a cement slurry than a "small" polymer, or a polymer with a lower molecular weight. However, large polymers have a negative impact on the properties of the cement slurry. The most common problem associated with large polymers as additives is an unwanted and deleterious increase in viscosity of the cement slurry. Cement fluid loss additives are needed which prevent excessive fluid loss and which also impart little or no added viscosity to the cement slurry.

Current fluid loss additives when used in the form of a non-aqueous water-in-oil emulsion or dispersion, or as a solid additive include the tendency to viscosify a cement slurry upon addition at the wellsite resulting in a fluid viscosity that is outside the desired range and can have negative impacts on other components of the cement slurry such that those other components fail to operate at their intended level and/or in their intended capacity. Thus an ongoing need exists for improved fluid loss additives and methods of utilizing same.

SUMMARY

The embodiments described herein generally relate to methods and chemical compositions for use with cementing processes. In one embodiment, a composition is provided comprising a random tetracopolymer having the formula styrene-butadiene-acrylic-fumaric acid, a polyvinyl acetate, and a nonionic surfactant. The composition may be used with a cementing process. The composition may be used deposited downhole for the application of cement slurry foaming control. The composition may be used deposited downhole for the application of cement slurry fluid loss control. The composition may be used deposited downhole for the application of cement body gas migration control. The composition may be premixed with a cement slurry. The composition may be used deposited downhole as a pre-flush in front of the cement slurry.

In another embodiment, a process is provided for using a composition including providing the composition comprising a random tetracopolymer having the formula styrene-butadiene-acrylic-fumaric acid, a polyvinyl acetate, and a nonionic surfactant, and depositing the composition downhole of a wellbore. The composition may be deposited downhole of a wellbore mixed with a cement slurry or prior to depositing a cement slurry.

The features, functions, and advantages that have been discussed can be achieved independently in various embodiments or may be combined in yet other embodiments, further details of which can be seen with reference to the following description and drawings.

DETAILED DESCRIPTION

The embodiments described herein generally relate to methods and chemical compositions for use with cementing processes. In one embodiment, a composition is provided comprising a random tetracopolymer having the formula styrene-butadiene-acrylic-fumaric acid, a polyvinyl acetate, and a nonionic surfactant.

The composition may be deployed as multiple functional additives for oilwell cement in wellbore treatment processes. In one embodiment, the composition is related to the wellbore cementing process in which the slurry fluid loss to the porous formation is minimized. The composition may also be related to the prevention of formation gases from migrating into the cured cement mass. The composition may also be related to effective mitigation of air or other gas entrainment in the slurry bulk that often takes place as a result of high speed blending. The composition components may be in a selected range of physical size and geometry. In one embodiment, the composition components may be selected from a diverse group of polymers that are aqueous insoluble and with various size and geometry; a discrete combination of which is capable of safeguard the quality of the cementing jobs. In one embodiment, the composition may be deployed either in the form of a pre-mix with the cement slurry or as a self-contained pre-flush pad.

In one embodiment, a composition for use with a cementing process is provided comprising a random tetracopolymer having the formula styrene-butadiene-acrylic-fumaric acid, a polyvinyl acetate, and a nonionic surfactant.

The random tetracopolymer comprises monomers of styrene, butadiene, acrylic acid, and fumaric acid.

In one embodiment, the random tetracopolymer may include from about 25 to about 75 wt % (weight percent) of styrene momomer, from about 10 to about 40 wt % of butadiene monomer, from about 1 to about 10 wt % of acrylic acid monomer, from about 1 to about 10 wt % of fumaric acid monomer, wherein the total amount of the monomers is 100%.

The random tetracopolymer may have a molecular weight range from about 10,000 to about 5,000,000 Dalton, such as from about 25,000 to about 3,000,000 Dalton, for example, from about 50,000 to about 2,000,000 Dalton. The random tetracopolymer may be water insoluble. The random tetracopolymer may be in a powder form. The powder form may have a size distribution range from about 10 to about 500 microns, such as or from about 50 to about 250 microns, for example, from about 100 to about 200 microns. The powder form may also be a combination of multi-modal solid forms including sphere, rod, oval, fiber, flake, sheet, star, and star, and any other geometric form, or a multimodal mixture thereof. The aspect ratio of such powders is in the range of 1:1000, or 1:500, or 1:100, or 1:50, or 1:10, or 1:5, or 1:2.5, or 1:1. The aspect ratio is used herein to describe the ratio of the X and Y dimensions of a 2-dimensional object (sheet), or the projection of a 3-dimensional object (particle). In addition to a 1:1 ratio particle, for example, a spherical powder, the aspect ratio also covers other geometries of solid objects including fiber and/or rod.

The polyvinyl acetate may have a molecular weight range from about 10,000 to about 5,000,000 Dalton, such as from about 25,000 to about 3,000,000 Dalton, for example, from about 50,000 to about 2,000,000 Dalton. The polyvinyl acetate may be water insoluble. The polyvinyl acetate may be in a powder form. The powder form may have a size distribution range from about 10 to about 500 microns, such as or from about 50 to about 250 microns, for example, from about 100 to about 200 microns. The powder form may also be a combination of multi-modal solid forms including sphere, rod, oval, fiber, flake, sheet, star, and star, and any other geometric form, or a multimodal mixture thereof. The aspect ratio of such powders is in the range of 1:1000, or 1:500, or 1:100, or 1:50, or 1:10, or 1:5, or 1:2.5, Or 1:1.

The random tetracopolymer and the polyvinyl acetate are present in the composition at a mass ratio from about 1:10 to about 10:1, such as from about 1:5 to about 5:1, for example, from about 1:2.5 to about 2.5:1.

The nonionic surfactant may be selected from the group consisting of an alkyl ethoxylate, alkyl polyglucoside, a polyamine-ethoxylated diamine, an alkylpropoxylated amine, a fatty alcohol, an alkylamide monoethanolamine, an alkylamide diethanolamine, an alkyldialkylamine oxide, an alkylamide, an ethoxylated amide alkoxylated alkyl phenol, an alkoxylated alcohol, a polyol, a polyol ester, an alkyliminodipropionate disodium, an alkylamphodiacetate disodium, an alkylampho hydroxypropyl sulfonate sodium, an alkylamidopropylhydroxysultaine, a lecithin, polyether derivated from polyethylene oxide or polypropylene oxide and combinations thereof. Examples of suitable nonionic surfactants include polyoxyethylene dodecyl mono ether, polyoxyethylene monolaurate, polyoxyethylene monohexadecyl ether, polyoxyethylene monooleate, polyoxyethylene mono (cis-9-octadecenyl)ether, polyoxyethylene monostearate, polyoxyethylene monooctadecyl ether, polyoxyethylene dioleate, polyoxyethylene distearate, and combinations thereof.

The nonionic surfactant may be from about 0.1 to about 3.0 wt % of the composition.

The nonionic surfactant may be disposed in a microporous carrier. The microporous carrier may include, and is not limited to, a material selected from the group of kaolin, glutamate salt, calcium carbonate, and combinations thereof. Loading level is the range of surfactant loading level or concentration in the microporous carrier.

If kaolin, such as kaolin flake, is used as the microporous carrier, the surfactant has a loading level from about 1 to about 25 wt % of the microporous carrier. In one embodiment, the kaolin flake may have a size distribution range from about 10 to about 500 microns, such as from about 50 to about 250 microns, for example from about 100 to about 200 microns. The aspect ratio of the flake is in the range of about 1:1000, or about 1:500, or about 1:100, or about 1:50, or about 1:10, or about 1:5, or 1:2.5, or about 1:1.

If glutamate salt is used as the microporous carrier, the surfactant has a loading level from about 1 to about 25 wt % of the microporous carrier. The glutamate salt may be selected from the group of sodium glutamate, potassium glutamate, lithium glutamate, ammonium glutamate, calcium glutamate, magnesium glutamate, and combinations thereof. In one embodiment, the glutamate salt is in the form of a flake, which flake may have a size distribution range from about 10 to about 500 microns, such as from about 50 to about 250 microns, for example from about 100 to about 200 microns. The aspect ratio of the flake is in the range of about 1:1000, or about 1:500, or about 1:100, or about 1:50, or about 1:10, or about 1:5, or 1:2.5, or about 1:1.

If calcium carbonate is used as the microporous carrier, the surfactant has a loading level from about 1 to about 25 wt % of the microporous carrier. In one embodiment, the calcium carbonate is in the form of a flake, which flake may have a size distribution range from about 10 to about 500 microns, such as from about 50 to about 250 microns, for example from about 100 to about 200 microns. The aspect ratio of the flake is in the range of about 1:1000, or about 1:500, or about 1:100, or about 1:50, or about 1:10, or about 1:5, or 1:2.5, or about 1:1.

Optionally, an ionic surfactant may be used with the nonionic surfactant. If used, the ionic surfactant may be selected from the group consisting of sodium and potassium salts of straight-chain fatty acids, polyoxyethylenated fatty alcohol carboxylates, linear alkyl benzene sulfonates, alpha olefin sulfonates, sulfonated fatty acid methyl ester, arylalkanesulfonates, sulfosuccinate esters, alkyldiphenylether(di)sulfonates, alkylnaphthalenesulfonates, isoethionates, alkylether sulfates, sulfonated oils, fatty acid monoethanolamide sulfates, polyoxyethylene fatty acid monoethanolamide sulfates, aliphatic phosphate esters, nonylphenolphosphate esters, fluorinated anionics, quaternary ammonium and combinations thereof. They can be either sodium bis(2-ethylhexyl) sulfosccinate (AOT), or didodecyldimethylammonium bromide (DDAB), or dodecyltrimethyl ammonium bromide (DTAB), or sodium dodecyl sulfate (SDS), or erucyl bis(2-hydroxyethyl) methyl ammonium chloride. The ionic surfactant has a loading level from about 1 to about 25 wt % of the microporous carrier.

In one embodiment, the surfactant disposed (infused) in a microporous carrier may be made by using a wet chemistry method, wherein the surfactant is mixed according to predetermined mass into an aqueous medium containing predetermined amount of microporous carrier, stirred at ambient temperature for a period of time, such as up to 120 minutes. Next the aqueous solution is dried in a desiccator under reduced pressure at ambient temperature, until the powders are free from apparent water Alternatively, the entire composition of the tetracopolymer, polyvinyl acetate and surfactant may be disposed or infused in the microporous carrier. In such an embodiment, the compositions has a loading level from about 1 to about 25 wt % of the microporous carrier.

Further alternatively, the additives may be infused into the selected microporous network of the carrier using a wet chemistry method, wherein the additives containing the tetracopolymer, polyvinyl acetate and surfactant are mixed according to predetermined mass ratio into an aqueous medium containing predetermined amount of microporous carrier, stirred at ambient temperature for a period of time, such as up to 120 minutes. Next the aqueous solution is dried in a desiccator under reduced pressure at ambient temperature, until the powders are free from apparent water.

In one embodiment, the composition may be used in the cementing job of a subterranean wellbore as fluid loss, formation gas migration and cement bulk foaming control additives. The overall loading level of the composition may be in the range of about 0.1 to about 5.0% based on the weight of the cementitious composition.

The composition may be blended into a cement slurry at a pre-defined loading level, such as described herein, and pumped together through a wellbore. Alternatively, the composition may be blended in water as dispersions and pumped through the wellbore as a pre-flush material. To one of skill in the art, "pre-flush" is a sacrificial fluid material used to displace (or drive out) the fluid already located in the wellbore before the main-body of the cement slurry is being pumped. This is necessary to avoid any chemical incompatibility issue between the two fluids. To one of skill in the art, depositing the composition as described herein is referred to as "pumping" or "pumped" such a composition, and the following description uses the term of art in the field.

In one embodiment, the composition described herein is pumped downhole of a wellbore for the application of cement slurry foaming control. In one embodiment, the composition described herein is pumped downhole of a wellbore for the application of cement slurry fluid loss control. In one embodiment, the composition described herein is pumped downhole of a wellbore for the application of cement body gas migration control. In one embodiment, the composition described herein is pumped downhole of a wellbore premixed with cement or a cement slurry. In one embodiment, the composition described herein is pumped downhole of a wellbore as a pre-flush in front of cement or a cement slurry.

EXAMPLES

Aspects and advantages of the embodiments described herein are further illustrated by the following examples. The particular materials and amounts thereof, as well as other conditions and details, recited in these examples should not be used to limit the embodiments described herein. All parts and percentages are by weight unless otherwise indicated.

Example 1: A Blending Procedure of Cementing Slurries

In an API compliant test using cement class H (obtained from Lafarge) 860 grams blended with 0.2 BWOC (by weight of cement) defoamer into water 327 grams at 4000 rpm for 15 seconds, followed at 12,000 rpm for 35 seconds. The viscosity of the slurry was measured at ambient temperature (72° F.) using a FANN 35 viscometer as 141 cP. The slurry was then transferred into a stirred fluid loss tester (acquired from OFI Testing Equipment) for conditioning up to 15 minutes at 150 rpm. Next a pressure differential of 1000 psi was applied to the cement slurry, and filtrate samples were taken at ambient temperature (72° F.) over 5 minute intervals for up to 30 minutes. The volume of filtrate collected over the period was on the level of 110 ml.

Against the above benchmark, an otherwise identical slurry was blended containing 0.6% BWOC (by weight of cement) designated fluid loss additive mixture (1:1 mass ratio) that resulted in a total collection of filtrate volume of 16 ml, thus demonstrating outstanding fluid loss control properties The unique compositions disclosed in this invention represent significant development in the effective control of cementing fluid loss at substantially lower dosage than any known analogues. It will bring cost saving benefit to the indispensable cementing process in well construction stage. In addition, they also exhibit the potential of other additional structural benefits to cement body.

While the foregoing is directed to embodiments of the present disclosure, other and further embodiments of the disclosure may be devised without departing from the basic scope thereof, and the scope thereof is determined by the claims that follow.

What is claimed is:
1. A composition, comprising
   a random tetracopolymer having the formula styrene-butadiene-acrylic-fumaric acid;
   a polyvinyl acetate; and
   a nonionic surfactant, wherein the random tetracopolymer has a molecular weight range of from about 10,000 to about 5,000,000 Dalton.
2. The composition of claim 1, wherein the tetracopolymer comprises:
   from about 25 to about 75 wt % of styrene monomer;
   from about 10 to about 40 wt % of butadiene monomer;
   from about 1 to about 10 wt % of acrylic acid monomer;
   from about 1 to about 10 wt % of fumaric acid monomer,
      wherein the total amount of the monomers is 100%.

3. The composition of claim 1, wherein the random tetracopolymer comprises a water insoluble compound in a powder form with a size distribution range from about 10 to about 500 microns.

4. The composition of claim 1, wherein the random tetracopolymer and the polyvinyl acetate are present in the composition at a mass ratio from about 1:10 to about 10:1.

5. The composition of claim 1, wherein the polyvinyl acetate has a molecular weight range of from about 10,000 to about 5,000,000 Dalton.

6. The composition of claim 1, wherein the polyvinyl acetate comprises a water insoluble compound in a powder form with a size distribution range between about 10 to about 500 microns.

7. The composition of claim 1, wherein the nonionic surfactant is disposed in a microporous carrier.

8. The composition of claim 7, wherein the microporous carrier is a material selected from the kaolin, glutamate salt, calcium carbonate, and combinations thereof.

9. The composition of claim 7, wherein the microporous carrier comprises a loading level from about 1 to about 25 wt. %.

10. The composition of claim 1, wherein the nonionic surfactant comprises from about 0.1 to about 3.0 wt % of the composition.

11. The composition of claim 1, wherein the composition is mixed with a cement slurry.

12. A process for using a composition, comprising:
providing the composition of claim 1; and
depositing the composition downhole of a wellbore.

13. The process of claim 12, wherein the composition is mixed with a cement slurry prior to depositing the composition downhole of the wellbore.

14. The process of claim 12, wherein the composition comprises a cement slurry foaming control, a cement slurry fluid loss control, a cement body gas migration control, or a combination thereof.

* * * * *